US009065666B2

(12) United States Patent
Patil (10) Patent No.: US 9,065,666 B2
(45) Date of Patent: Jun. 23, 2015

(54) SYSTEM AND METHOD OF MULTI-MEDIA CONFERENCING BETWEEN UNIVERSAL PLUG AND PLAY (UPNP) ENABLED TELEPHONY DEVICES AND WIRELESS AREA NETWORK (WAN) DEVICES

(75) Inventor: Mayuresh Madhukar Patil, Bangalore (IN)

(73) Assignee: Samsung Electronics Co., Ltd (KR)

( * ) Notice: Subject to any disclaimer, the term of this patent is extended or adjusted under 35 U.S.C. 154(b) by 312 days.

(21) Appl. No.: 12/969,041

(22) Filed: Dec. 15, 2010

(65) Prior Publication Data

US 2011/0141950 A1 Jun. 16, 2011

(30) Foreign Application Priority Data

Dec. 15, 2009 (IN) .......................... 3104/CHE/2009

(51) Int. Cl.
*H04L 12/18* (2006.01)
*H04L 12/28* (2006.01)
*H04L 29/06* (2006.01)

(52) U.S. Cl.
CPC ........ *H04L 12/1818* (2013.01); *H04L 12/2809* (2013.01); *H04L 12/2836* (2013.01); *H04L 65/1069* (2013.01); *H04L 65/403* (2013.01)

(58) Field of Classification Search
USPC ........................................................ 370/261
See application file for complete search history.

(56) References Cited

U.S. PATENT DOCUMENTS 6,243,398 B1 * 6/2001 Kahane et al. ................. 370/522
6,711,158 B1 * 3/2004 Kahane et al. ................. 370/352
7,184,531 B2 * 2/2007 Crouch .................... 379/202.01
7,197,049 B2 * 3/2007 Engstrom et al. ............. 370/469
7,346,341 B2 * 3/2008 Costa-Requena et al. . 455/414.3
7,385,975 B2 * 6/2008 Liu ............................... 370/389

(Continued)

FOREIGN PATENT DOCUMENTS

CN 101341720 1/2009
JP 2006-148806 6/2006

(Continued)

OTHER PUBLICATIONS

A. Johnston et al., "Session Initiation Protocol Call Control—Conferencing for User Agents; draft-ietf-sipping-cc-conferencing-07", Jun. 3, 2005.

(Continued)

*Primary Examiner* — Ian N Moore
*Assistant Examiner* — Lakeram Jangbahadur
(74) *Attorney, Agent, or Firm* — The Farrell Law Firm, P.C.

(57) ABSTRACT

A system and method of multi-media conferencing between Universal Plug and Play (UPnP) telephony devices and Wide Area Network (WAN) devices is provided. The method includes initiating a multi-media conferencing session with WAN devices by at least one telephony control point (TCP) in an UPnP telephony based home network via a session request. The session request includes session information, media capabilities of a telephony client device (TC) associated with the at least one TCP, a list of WAN devices or a conference group identifier associated with one or more WAN devices, and a subject of the multi-media conferencing session. The method further includes establishing the multi-media conferencing session between the TC and the WAN devices by a telephony server (TS) in the UPnP telephony based home network based on the session request.

20 Claims, 6 Drawing Sheets

(56) References Cited

U.S. PATENT DOCUMENTS

| | | | |
|---|---|---|---|
| 7,441,019 B2* | 10/2008 | Zintel et al. | 709/220 |
| 7,558,846 B2* | 7/2009 | Gu et al. | 709/220 |
| 7,583,685 B2* | 9/2009 | Ajitomi et al. | 370/401 |
| 7,668,159 B2* | 2/2010 | Buckley et al. | 370/354 |
| 7,729,365 B2* | 6/2010 | Motegi et al. | 370/401 |
| 7,747,596 B2* | 6/2010 | Bigioi et al. | 707/705 |
| 7,783,771 B2* | 8/2010 | Pantalone | 709/230 |
| 7,899,167 B1* | 3/2011 | Rae | 379/189 |
| 8,027,353 B2 | 9/2011 | Damola et al. | 370/401 |
| 8,031,641 B2* | 10/2011 | Hwang et al. | 370/260 |
| 8,194,681 B2* | 6/2012 | Kaarela et al. | 370/401 |
| 8,250,142 B2* | 8/2012 | AbiEzzi et al. | 709/204 |
| 8,281,017 B2* | 10/2012 | Handa | 709/227 |
| 8,289,980 B2* | 10/2012 | Cagenius et al. | 370/401 |
| 8,473,583 B2 | 6/2013 | Maeng et al. | |
| 2003/0140344 A1 | 7/2003 | Bhatti | |
| 2004/0246332 A1 | 12/2004 | Crouch | |
| 2005/0195274 A1 | 9/2005 | Abiezzi et al. | |
| 2006/0083244 A1 | 4/2006 | Jagadesan et al. | |
| 2006/0245403 A1 | 11/2006 | Kumar | |
| 2007/0143488 A1 | 6/2007 | Pantalone | |
| 2007/0143489 A1 | 6/2007 | Pantalone | |
| 2007/0200920 A1 | 8/2007 | Walker et al. | |
| 2009/0138605 A1 | 5/2009 | Handa | |
| 2010/0049965 A1 | 2/2010 | Han et al. | |
| 2010/0198954 A1* | 8/2010 | Grasso et al. | 709/223 |
| 2010/0284398 A1 | 11/2010 | Maeng et al. | |

FOREIGN PATENT DOCUMENTS

| | | |
|---|---|---|
| JP | 2009-520438 | 5/2009 |
| JP | 2011-530947 | 12/2011 |
| JP | 2012-500435 | 1/2012 |
| JP | 2012-526445 | 10/2012 |

OTHER PUBLICATIONS

J. Rosenberg, "A Framework for Conferencing with the Session Initiation Protocol; draft-ietf-sipping-conferencing-framework-05", May 27, 2005.

Mark Walker et al., "New Uses, Proposed Standards, and Emergent Device Classes for Digital Home Communications", Intel Technology Journal, 2006.

Katsuhiko Sakaguchi, "SIP Introduction ? SIP for Establishing the Ubiquitous Era and Tendency of SIP in Protocol Overview", Internet Week 2004, Dec. 2, 2004.

Takao Kurahashi et al., "Review on Contents Transmission Scheme in NGN Environment," Institute of Image Electronics Engineers of Japan, Jan. 15, 2010.

* cited by examiner

SYSTEM AND METHOD OF MULTI-MEDIA CONFERENCING BETWEEN UNIVERSAL PLUG AND PLAY (UPNP) ENABLED TELEPHONY DEVICES AND WIRELESS AREA NETWORK (WAN) DEVICES

PRIORITY

This application claims priority under 35 U.S.C. §119(a) to an application filed in the Indian Patent Office on Dec. 15, 2009 and assigned Serial No. 3104/CHE/2009, the content of which is incorporated herein by reference.

BACKGROUND OF THE INVENTION

1. Field of the Invention

The present invention relates to a field of communication and more particularly to multi-media conferencing between UPnP enabled telephony devices and WAN devices.

2. Description of the Related Art

Universal Plug and Play (UPnP) is a set of computer network protocols promulgated by the UPnP Forum. The goals of UPnP forum are to allow devices to connect seamlessly and to simplify implementation of networks in home data sharing, communications, and entertainment and corporate environments. UPnP achieves this by defining and publishing UPnP device control protocols built upon open, Internet-based communication standards.

The UPnP architecture allows peer-to-peer networking of personal computers (PCs), networked appliances, and wireless devices. It is a distributed, open architecture based on established standards (e.g., UPnP telephony device/IP, UDP, HTTP and XML). The UPnP architecture supports zero-configuration networking. An UPnP compatible device from any vendor can dynamically join a network, obtain an IP address, announce its name, convey its capabilities upon request, and learn regarding presence and capabilities of other devices.

Similarly, UPnP devices can leave the network automatically without providing any unwanted state information. UPnP protocol provides discovery, control and eventing mechanisms. Discovery is enabled using Simple Service Delivery (SSD) protocol. All control messages are in the form of extended markup language (XML). Eventing follows General Event Notification Architecture (GENA) protocol. Using these technologies, UPnP makes availability and unavailability of the UPnP devices on the fly to the other devices in the network.

The UPnP forum also provides telephony services for extending user experience in a home to access telephony services like messaging service, presence service, and Call handling (PS/CS call) service. As analogous to UPnP DA, telephony defines three kinds of devices, viz. a telephony server (TS) that provides messaging, and presence related services to the user, a telephony control point (UPnP telephony device) to initiate actions provided by the TS and a telephony client device (TC) for media related handling and providing input and output to/from the TS.

The UPnP telephony services enables a user to initiate a call to any user outside the UPnP network using a wide area network (WAN) calling technology like VOIP or other calling technologies. However, the UPnP telephony service allows the user to initiate the call with a single WAN device and not a conference call media session with two or more WAN users as the UPnP telephony network may not support all types of media content. For example, a television set can display a plain text and may not support video. In case, video frames need to be retrieved, media negotiation has to be carried out prior to performing setting up the multi-media conferencing session. Additionally, the WAN devices are unaware of the media capabilities of the UPnP telephony device or TC.

If the media capabilities, such as supported multipurpose internet mail extensions (MIME) types, are not considered, then it is possible that the UPnP telephony device may receive unsupported media content from the WAN devices (not at all supported by the UPnP telephony device) in the conference call media session, resulting in inconsistent user experience with respect to the conference call media session. Currently, the UPnP telephony service fails to capture and provide dynamic session information (e.g., the user leaving or joining the session) associated with the conference call media session as dynamic information is required to be pushed to the user rather than pulled from the UPnP telephony device.

SUMMARY OF THE INVENTION

The present invention provides a system and method of multi-media conferencing between Universal Plug and Play (UPnP) telephony devices and wide area network (WAN) devices. According to one aspect of the present invention, a method includes initiating a multi-media conferencing session with WAN devices by at least one telephony control point (TCP) in an UPnP telephony based home network via a session request. The session request includes session information, media capabilities of a telephony client device (TC) associated with the at least one TCP, a list of WAN devices or a conference group identifier associated with the WAN devices, and a subject of the multi-media conferencing session. The method further includes establishing the multi-media conferencing session between the TC and the WAN devices by a telephony server (TS) in the UPnP telephony based home network based on the session request.

According to another aspect of the present invention, an UPnP telephony based home network system includes at least one TCP for initiating a multi-media conferencing session with WAN devices via a session request, and one or more TCs coupled to the at least one TCP. The system also includes a TS connected to the at least one TCP and the one or more TCs for establishing the multi-media conferencing session between one of the one or more TCs and the WAN devices based on the session request.

Other features of the embodiments will be apparent from the accompanying drawings and from the detailed description that follows.

BRIEF DESCRIPTION OF DRAWINGS

The above and other aspects, features and advantages of the present invention will be more apparent from the following detailed description taken in conjunction with the accompanying drawings, in which.

The drawings described herein are for illustration purposes only and are not intended to limit the scope of the present disclosure in any way.

DETAILED DESCRIPTION OF THE INVENTION

The present invention provides a system and method of multi-media conferencing between Universal Plug and Play (UPnP) enabled telephony devices and Wide Area Network (WAN) devices. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
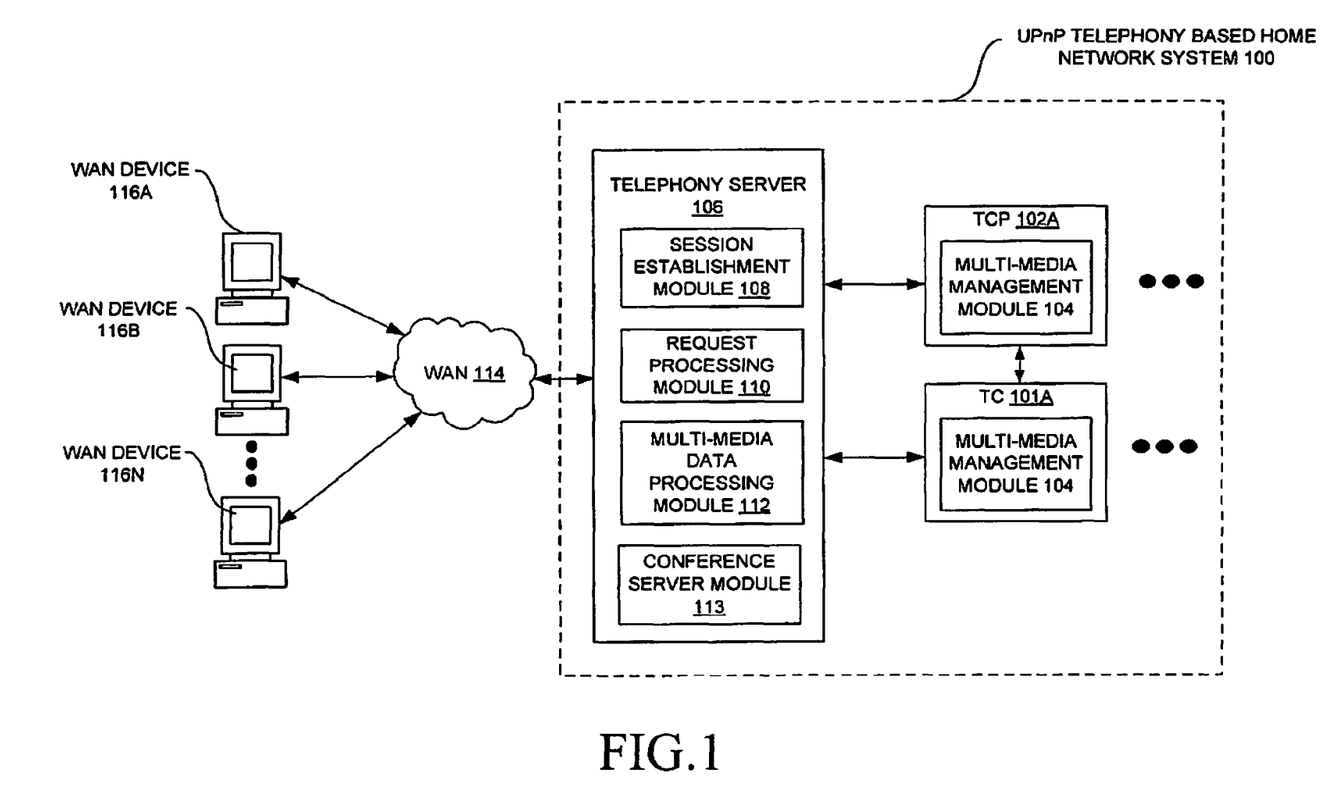
FIG. 1 is a block diagram of an Universal Plug and Play (UPnP) telephony based home network system enabling multi-media conferencing between one or more telephony client devices (TCs) and Wide Area Network (WAN) devices, according to one embodiment.

FIG. 1 is a block diagram of an UPnP telephony based home network system 100 enabling multi-media conferencing between one or more telephony client devices 101A-N and WAN devices 116A-N, according to one embodiment. In FIG. 1, the UPnP telephony based home network system 100 includes a plurality of UPnP enabled telephony devices communicatively connected to a telephony server (TS) 106. The TS 106 is connected to the WAN devices 116A-N via the WAN 114.

The UPnP enabled telephony devices 102A-N includes one or more telephony control points (TCPs) 102A-N and one or more telephony client devices (TCs) 101A-N associated with each of the TCPs 102A-N. Each of the UPnP enabled telephony devices includes a multi-media management module 104 for enabling initiating, modifying, updating local media capabilities and joining a multi-media conferencing session associated with the WAN devices 116A-N as illustrated in FIG. 1. The multi-media conferencing session is initiated via a session request that includes list of WAN devices or conference group identifier associated with one or more of the WAN devices 116-N, a local session identifier, media capabilities (e.g., MIME types) associated with the one or more TCs 101A-N, a session subject, and a session type.

The multi-media conferencing session may be a video conferencing session, an audio conferencing session, and an audio and video conferencing session. The TS 106 includes a request processing module 110 for processing a session request (e.g., initiate session request, a global modify session request, a join session request and a local media update request) received from the one of TCPs 102A-N. The TS 106 also includes a session establishment module 108 for establishing a multi-media conferencing session between the one or more TCs 101A-N and the one or more WAN devices 116A-N based on the session request.

The TS 106 further includes a multi-media data processing module 112 for enabling multi-media conferencing between the TCs 101A-N and the WAN devices 116A-N based on media capabilities of respective one or more TCs 101A-N. The message processing module 112 may also allow the TCPs 102A-N to subscribe to dynamic session information associated with the ongoing multi-media conferencing session using General Event Notification Architecture (GENA) protocol.

For example, the dynamic session information may include user leaving the session information, user joining the session information, any changes made to the multi-media conferencing session and the like. In case the TCP 102A subscribes, the TS 106 provides the dynamic session information associated with the ongoing multi-media conferencing session as notifications to the TCP 102A. The TCP 102A provides the dynamic session information to associated one or more of the TCs 101A-N. The TS 106 also includes a conference server module 113 for hosting the multi-media conference session on the TS 106 in absence of an external conference server associated with one or more of the WAN devices 116A-N. Moreover, the operation of the UPnP telephony based home network system 100 is described in greater detail in FIGS. 2-5.

Figure 2:
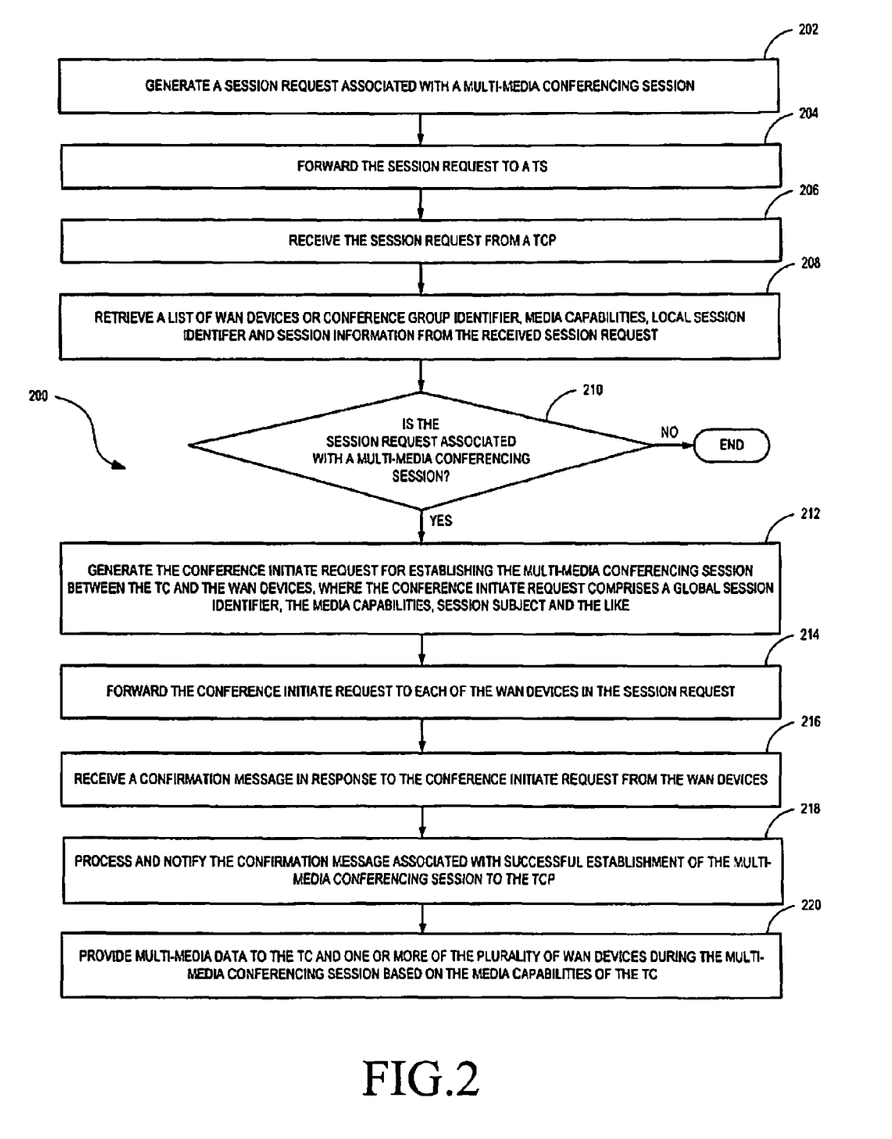
FIG. 2 is a process flow chart illustrating an exemplary method of multi-media conferencing between a TC in the UPnP telephony based home network system and the WAN devices, according to one embodiment.

FIG. 2 is a process flow chart 200 illustrating an exemplary method of multi-media conferencing between the TC 101A in the UPnP telephony based home network system 100 and the WAN devices 116A-N, according to one embodiment. At step 202, a session request for initiating a multi-media conferencing session is generated by the TCP 102A. The session request includes a list of WAN devices or conference group identifier associated with the WAN devices 116A-N, local session identifier, media capabilities of the TC 101A, and session information (e.g., subject). In one example embodiment, the session request includes list of WAN devices for an adhoc type multi-media conferencing session. In an alternate embodiment, the session request includes conference group identifier associated with the WAN devices in case of a pre-arranged multi-media conferencing session. Exemplary schema for initiating the prearranged multi-media conferencing session using a conference group already defined in an address book of the TS 106 is shown in APPENDIX 'A'. It is appreciated that, the media negotiation is performed in similar manner as defined in the UPnP telephony call management standard. Additionally, the media capabilities of the TC 101A in the session request are used during the media negotiation.

At step 204, the session request is forwarded to the TS 106 by the TCP 102A. At step 206, the session request is received by the TS 106 from the TCP 102A. At step 208, the received session request is processed and the list of WAN devices or the conference group identifier associated with the WAN devices 116A-N, the local session identifier, the media capabilities of the TC 101A, and the session information (e.g., subject) is retrieved from the received session request by the TS 106.

At step 210, it is determined whether the session request is associated with a multi-media conferencing session based on the session information. On one hand, if the session identifier indicates 'individual', then it is determined that the session request is not associated with the multi-media conferencing session. In such case, the process 200 is terminated. On the other hand, if the session identifier embedded in the session request is 'group' then it is determined that the session request is associated with the multi-media conferencing session. In such case, the conference initiate request is generated by the TS 106 for establishing the multi-media conferencing session between the TC 101A and the WAN devices 116A-N at step 212. For example, the conference initiate request may include a global session identifier, conference link (e.g., agenda), the media capabilities of the TC 101A, the session subject and the like.

At step 214, the conference initiate request is forwarded by the TS 106 to each of the WAN devices 116A-N requested in the session request. As mentioned above, if the WAN device is having an external conference server, the TS forwards the conference initiate request to the external conference server and updates static information such as the conference link (e.g., agenda), the media capabilities of the TC 101A, and the session subject in the external conference server. Exemplary schema of static information as per OMA standard is shown in APPENDIX 'B'. Otherwise the conference initiate request is directly sent to the WAN devices 116A-N in which case the TS 106 host the multi-media conferencing session on the conference server module 113. At step 216, a confirmation message is received from each of the WAN devices 116A-N in response to the conference initiate request. At step 218, the confirmation message associated with successful establishment of the multi-media conferencing session is processed and the TCP 102A is notified by the TS 106 through the processed confirmation message.

At step 220, multi-media data received from one or more of the WAN devices 116A-N is provided to the TC 101A based on the media capabilities negotiated during the multi-media conferencing session. In one embodiment, the multi-media data is provided to the TC 101A in such a manner that the multi-media data is outputted on the TC 101A in a compatible format. Alternatively, the multi-media data received from the TC 101A is provided to the one or more of the WAN devices 116A-N. The above process 200 may also allow the TCP 102A to modify, join or locally update the ongoing multi-media conferencing session with the WAN devices 116A-N as described in greater detail in FIGS. 3, 4 and 5. Further, the above-described process 200 may provide dynamic information to the TCP 102A during the ongoing multi-media conferencing session.

Figure 3:
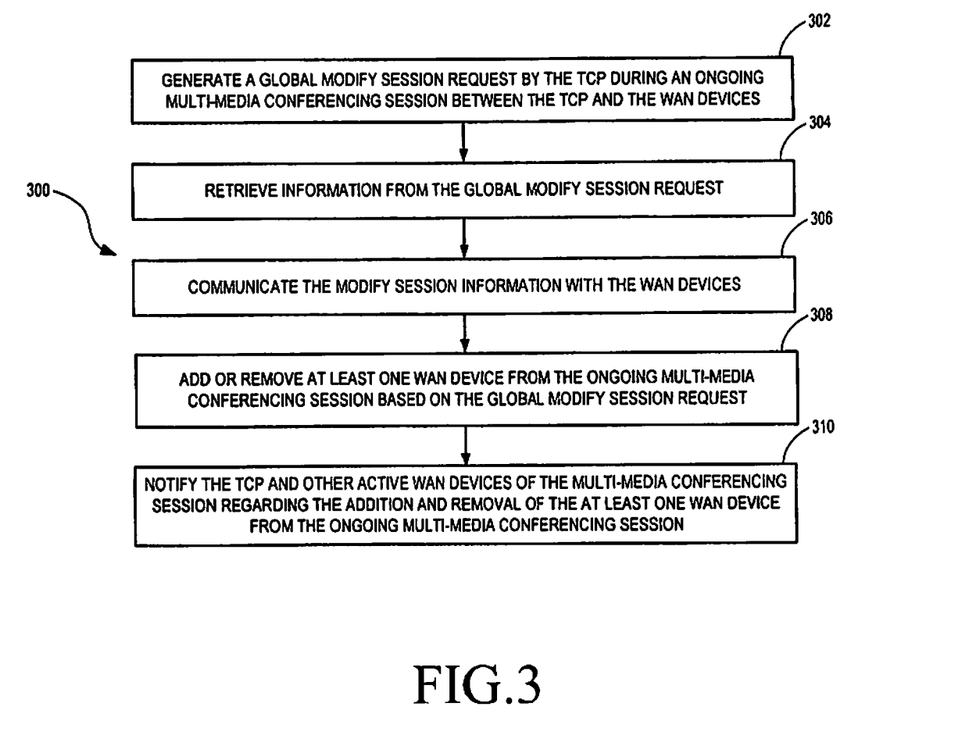
FIG. 3 is a process flow chart illustrating an exemplary method of adding or removing at least one WAN device by a telephony control point (TCP) into/from the ongoing multi-media conferencing session, according to one embodiment.

FIG. 3 is a process flow chart 300 illustrating an exemplary method of adding or removing at least one WAN device by the TCP 102A into/from the ongoing multi-media conferencing session, according to one embodiment. At step 302, a global modify session request is generated by the TCP 102A during the ongoing multi-media conferencing session between the TCP 102A and the WAN devices 116A-N. The global modify session request includes optionally new subject information, optionally new media capabilities of the TC 101A, and at least one WAN device to be added/removed into/from the multi-media conferencing session.

At step 304, information is retrieved by the TS 106 from the received global modify session request. At step 306, the modify session information is communicated with the WAN devices 116A-N by the TS 102 over the WAN 114. At step 308, at least one WAN device is added or removed to/from the ongoing multi-media conferencing session based on the global modify session request. At step 310, the TCP 102A and other active WAN devices of the ongoing multi-media conferencing session are notified regarding the addition and removal of the at least one WAN device from the ongoing multi-media conferencing session. It can be noted that, steps 304-310 are performed by the TS 106. In the same manner, the TCP 102A can update the information (e.g., status, subject, conference schedule information, media capabilities, etc.) during the ongoing multi-media conferencing session.

Figure 4:
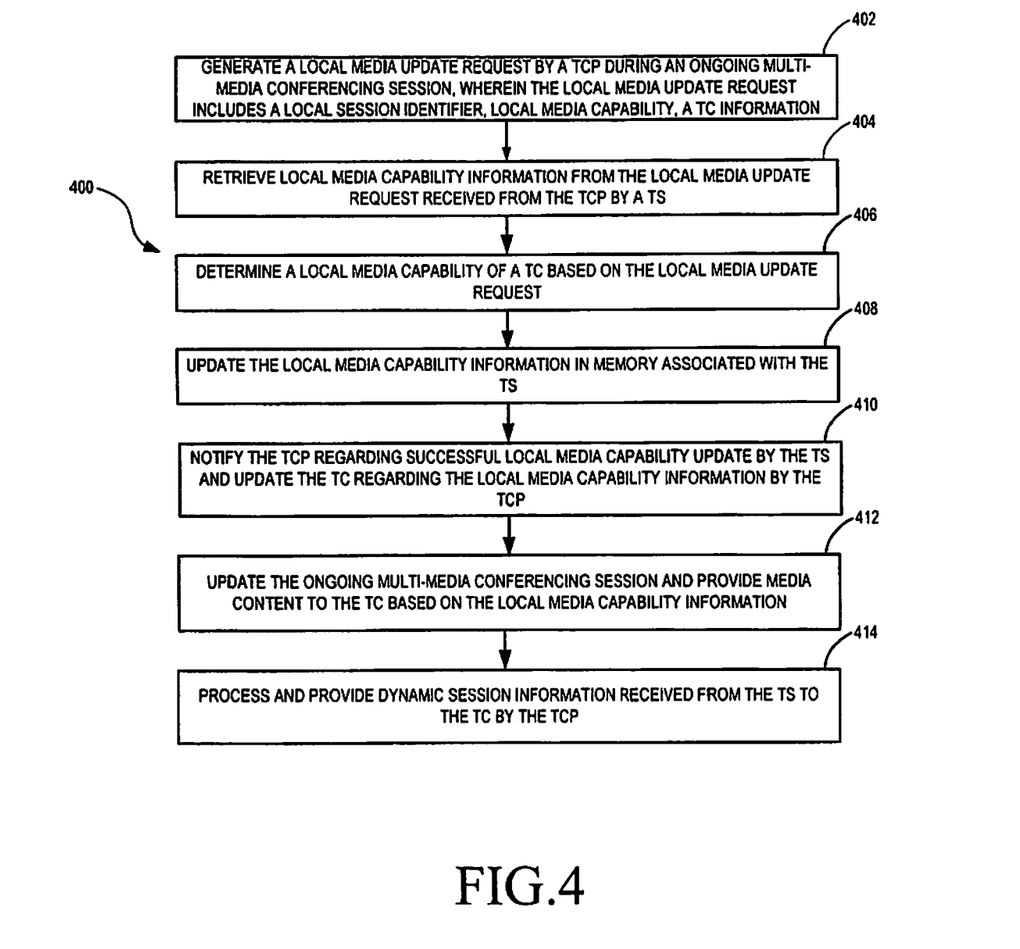
FIG. 4 is a process flow chart illustrating an exemplary method of providing media content based on local media capability information associated with a TC during the ongoing multi-media conferencing session, according to one embodiment.

FIG. 4 is a process flow chart 400 illustrating an exemplary method of providing media content based on local media capability information associated with a TC during the ongoing multi-media conferencing session, according to one embodiment. At step 402, a local media update request is generated by the TCP 102A during the ongoing multi-media conferencing session. The local media request is generated by the TCP 102A when the TCP 102 wishes to update media capabilities locally in the UPnP telephony based home network system 100. The TCP 102A then sends the local media update request to the TS 106. The local media update request includes local session identifier, local media capability information of a TC 101B, and information associated with the TC 101B. The local media request includes the information associated with the TC 101B as the TCP 102A wishes to switch the ongoing multi-media conferencing session from the TC 101A to the TC 102B.

At step 404, the local media capability information is retrieved from the local media update request received by the TS 106. The local media capability information indicates media capabilities of the TC 101B for receiving media content during the ongoing multi-media conferencing session. At step 406, the local media capability of the TC 101B is determined based on the retrieved local media capability information. At step 408, the local media capability is updated in the memory of the TS 106. At step 410, the TCP 102A is notified regarding the successful local media capability update by the TS 106 and the TC 101B is updated by the TCP 102A regarding the updated local media capability information.

At step 412, the ongoing multi-media conferencing session is updated and updated media content is provided to the TC 101B by the TS 106 during the ongoing multi-media conference messaging session based on the local media capability information. At step 414, the dynamic information received from the TS 106 is processed and forwarded to the TC 101B by the TCP 102A since the TC 101B is not capable of receiving and displaying the dynamic information from the TS 106. In this manner, the above method provides a 3 box model in the UPnP telephony based home network system 100. Alternatively, one can envision that, the TCP 102A may send a local update request for updating new local media capability of the TC 101A such that the TS 106 provides media content to the TC 101A based on the new local media capability in the local media update request. For example, if the new local media capability indicates that the TC 101A wishes to receive video content and not audio content, then the TS 106 blocks the audio and provides only video content to the TC 101A.

Figure 5:
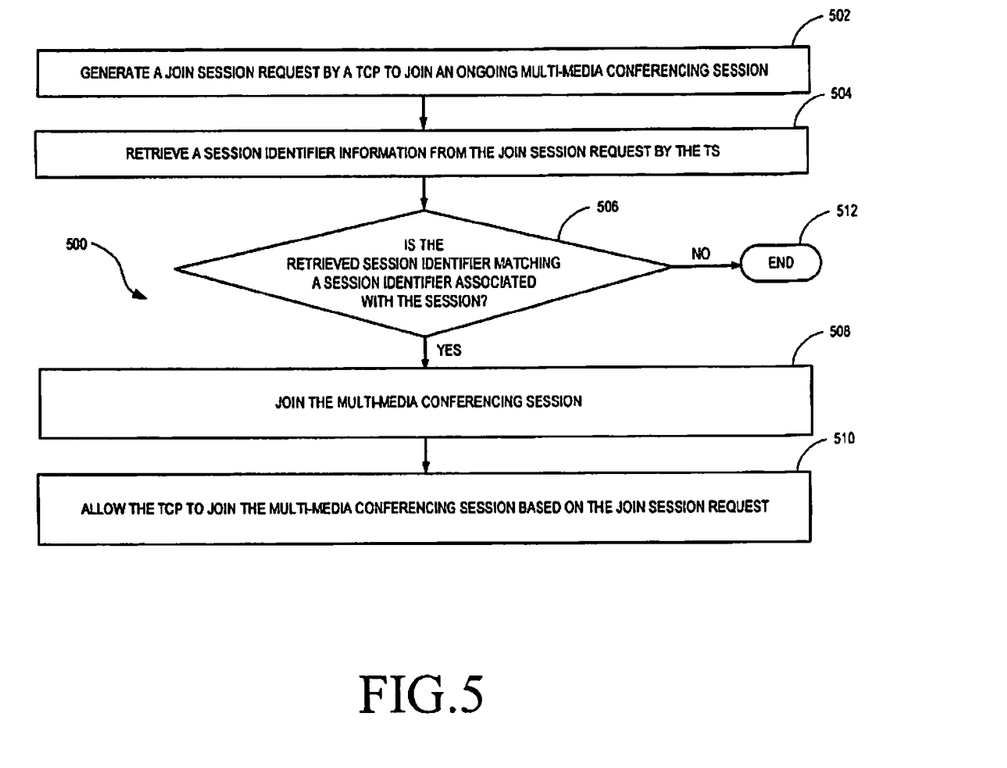
FIG. 5 is a process flow chart illustrating an exemplary method of joining the ongoing multi-media conferencing session with the WAN devices, according to one embodiment.

FIG. 5 is a process flow chart 500 illustrating an exemplary method of joining the ongoing multi-media conferencing session with the WAN devices 116A-N, according to one embodiment. At step 502, a join session request is generated by the TCP 102A to join the ongoing multi-media conferencing session. For example, the TCP 102A may generate the join session request if the battery of mobile phone is running low or loss of signal to the TS 106. At step 504, a session identifier is retrieved from the received join session request by the TS 106.

At step 506, it is determined whether the retrieved session identifier matches with the session identifier associated with the ongoing multi-media conferencing session. If the match is found, the TS 106 joins the ongoing multi-media conferencing session, at step 508. At step 510, the TCP 102A is allowed to join the ongoing multi-media conferencing session based on the join session request. If no match is found, then at step 512, the join session request is terminated.

Moreover, in one example embodiment, a non-transitory computer-readable storage medium has instructions that, when executed by one of the TCPs (e.g., Television, Personal Computer) and/or TS 102 (e.g., mobile phone, PDA, and the like), causes the one of the TCPs and the TS 106 perform the methods of FIGS. 2-5.

Figure 6:
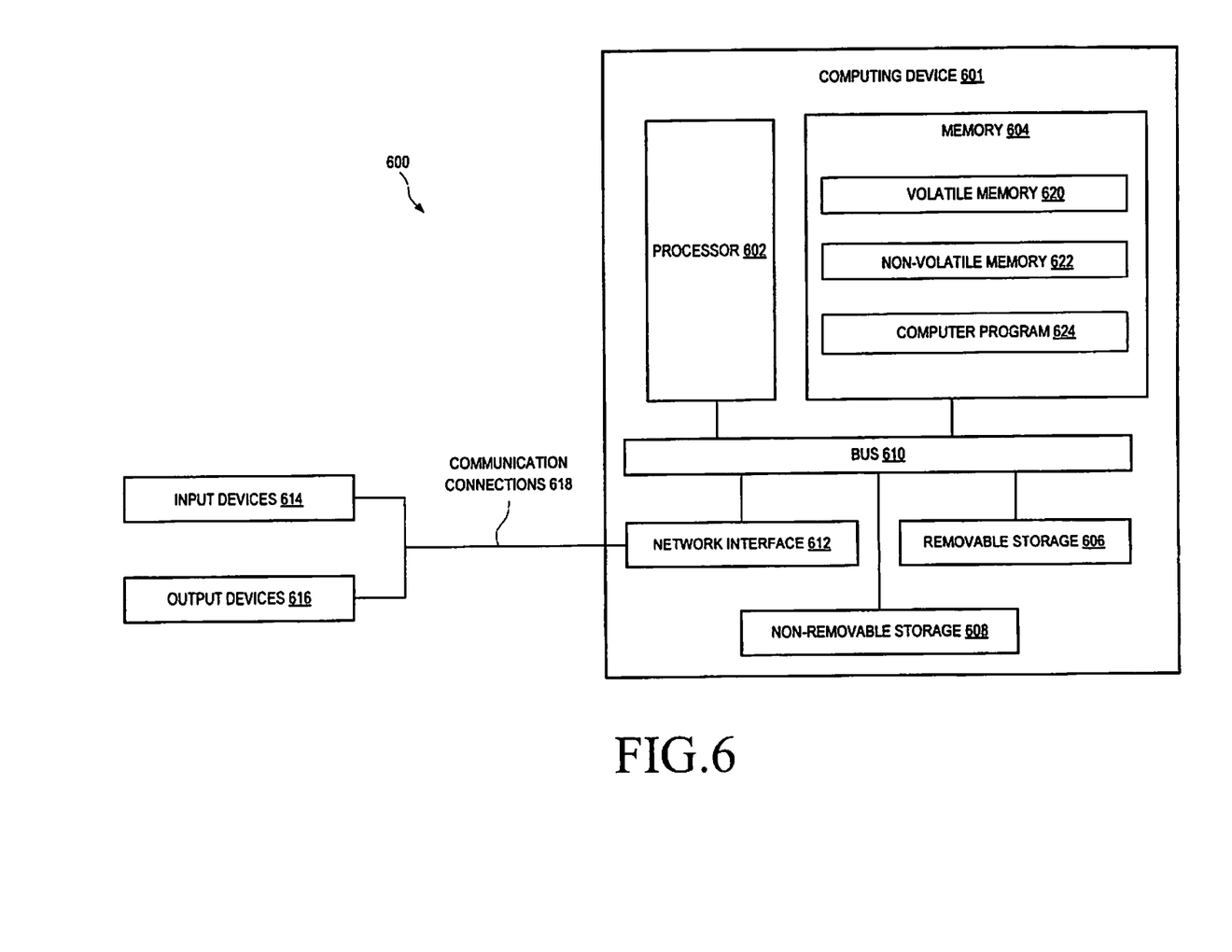
FIG. 6 shows an example of a suitable computing system environment for implementing embodiments of the present subject matter.

FIG. 6 shows an example of a suitable computing system environment 600 for implementing one or more embodiments of the present subject matter. FIG. 6 and the following discussion are intended to provide a brief, general description of the suitable computing system environment 600 in which certain embodiments of the inventive concepts contained herein may be implemented.

A general computing device 601, such as the TCP 102A and the TS 106, may include the processor 602, the memory 604, a removable storage 606, and a non-removable storage 608. The computing device 601 additionally includes a bus 610 and a network interface 612. The computing device 601 may include or have access to the computing environment 600 that includes one or more user input devices 614, one or more output devices 616, and one or more communication connections 618 such as a network interface card or a universal serial bus connection. The one or more user input devices 614 may be keyboard, mouse, and the like. The one or more output devices 616 may be a display of the TS 106 and the TCP 102A. The communication connections 618 may include an UPnP telephony based home network.

The memory 604 may include volatile memory 620 and non-volatile memory 622. A variety of computer-readable storage media may be stored in and accessed from the memory elements of the computing device 601, such as the volatile memory 620 and the non-volatile memory 622, the removable storage 606 and the non-removable storage 608. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 602, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 604 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 602 of the computing device 601. For example, a computer program 624 may include machine-readable instructions capable of multi-media conferencing between UPnP enabled telephony devices and WAN devices, according to the teachings and herein described embodiments of the present subject matter. In one embodiment, the computer program 624 may be included on a compact disk-read only memory (CD-ROM) and loaded from the CD-ROM to a hard drive in the non-volatile memory 622. The machine-readable instructions may cause the computing device 601 to encode according to the various embodiments of the present subject matter.

It will be appreciated that the various embodiments discussed herein may not be the same embodiment, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

APPENDIX 'A'

```
<?xml version="1.0" encoding="utf-8"?>
<peerList:peerList
    xsi:schemaLocation="urn:schemas-upnp-org:phone:peer
    http://www.upnp.org/schemas/phone/peer-v1.xsd"
    xmlns:xsi="http://www.w3.org/2001/XMLSchema-instance"
    xmlns:peer="urn:schemas-upnp-org:phone:peer">
    <peer:Peer>
    <peer:id>
        The identifier of the Peer (e.g., phone number, etc.)
    </peer:id>
      <peer:name>A user friendly name for the Peer</peer:name>
      <peer:contactInstanceId>
        The instance identifier for a contact referred by the Peer
      </peer:contactInstanceId>
      <peer:groupInstanceId>
        The instance identifier for a group referred by the Peer
      </peer:groupInstanceId>
    </peer:peer>
</peerList:peerList><?
```

APPENDIX 'B'

```
<?xml version="1.0" encoding="UTF-8"?>
<StaticConferenceInfo xmlns="urn:schemas-upnp-org:phone:messaging"
xmlns:xsi="http://www.w3.org/2001/XMLSchema-instance"
xsi:schemaLocation="urn:schemas-upnp-org:phone:messaging
http://www.upnp.org/schemas/phone/messaging-v1.xsd">
    <Conference_Call_Information>
        <ConferenceSessionID>1234</ConferenceSessionID>
        <ConferenceType>ad-hoc</conferencetype>
        <ConferenceSubject>UPnP-Messaging Spec Review
        </ConferenceSubject>
        ...
        ...
    </Conference_Call_Information>
</StaticConferenceInfo>
```

What is claimed is:

1. A method of multi-media conferencing between telephony devices included in a first network and at least one network device connected to a second network, the method comprising:
   receiving, by a telephony server (TS), a session request for a multi-media conferencing session from a telephony control point (TCP); and
   establishing, by the TS, the multi-media conferencing session between a telephony client (TC) and the network device based on the session request, wherein the establishing the multi-media conferencing session comprises:
     retrieving a first session identifier, a information of the network device or a conference group identifier of the network device, a media capabilities of the TC, and a session information from the received session request; and transmitting, to the network device, a session initiate request including a second session identifier, the media capabilities of the TC, and the session information;

wherein the first session identifier includes information that identifies the multi-media conferencing session between the TC and the TS, and the second session identifier includes information that identifies the multi-media conferencing session on the network device.

2. The method of claim 1, wherein establishing the multi-media conferencing session between the TC and the network device by the TS further comprises:

initiating the multi-media conferencing session with the network device based on the session request using the second session identifier; and providing multi-media data to the TC based on the media capabilities of the TC or to the network device.

3. The method of claim 1, wherein establishing the multi-media conferencing session further comprises forwarding a multi-media conference initiate request to each of the network device from the information of the network device when the session request is associated with the multi-media conferencing session based on the session information.

4. The method of claim 3, wherein forwarding the multi-media conference initiate request to the network device in the session request comprises:

generating the multi-media conference initiate request for establishing the multi-media conferencing session between the TC and the network device, wherein the multi-media conference initiate request comprises the second session identifier, the media capabilities of the TC, and a session subject; and sending the generated multi-media conference initiate request to the network device based on the information of the network device or the second session identifier via the network device.

5. The method of claim 4, wherein, after sending the generated multi-media conference initiate request, the method further comprises:

receiving a confirmation message from the network device in response to the multi-media conference initiate request;

processing the confirmation message associated with successful establishment of the multi-media conferencing session; and notifying the TCP through the processed confirmation message.

6. The method of claim 5, wherein in establishing the multi-media conferencing session between the TC and the network device, the multi-media conferencing session is selected from the group consisting of a video conferencing session, an audio conferencing session, and an audio and video conferencing session.

7. The method of claim 6, wherein establishing the multi-media conferencing session between the TC and the network device based on the session request comprises:

receiving multi-media data from the network device by the TS during the multi-media conferencing session; and processing and forwarding the multi-media data to the TC based on the media capabilities of the TC during the multi-media conferencing session such that the multi-media data is outputted on the TC in a compatible format.

8. The method of claim 1, further comprising:

receiving, by the TS, a global modify session request from the TCP during the ongoing multi-media conferencing session between the TC and the network device, wherein the global modify session request comprises subject information, media capabilities of the TCP, the network device to be added into or removed from the multi-media conferencing session;

retrieving, by the TS, information from the global modify session request received from the TCP;

communicating, by the TS, modify session information to the network device;

adding or removing, by the TS, the network device from the ongoing multi-media conferencing session based on the global modify session request; and notifying, by the TS, the TCP and other active network device of the multi-media conferencing session regarding the addition and removal of the network device from the ongoing multi-media conferencing session.

9. The method of claim 1, further comprising:

receiving, by the TS, a join session request from the TCP;

retrieving, by the TS, session identifier information from the join session request received from the TCP;

determining, by the TS, whether the retrieved session identifier matches with the session identifier of the ongoing multi-media conferencing session;

if so, joining the ongoing multi-media conferencing session;

if so, allowing the TC to join the ongoing multi-media conferencing session based on the join session request; and if not, terminating the join session request received from the TCP.

10. The method of claim 1, wherein establishing the multi-media conferencing session between the TC and the network device further comprises:

providing dynamic session information of the ongoing multi-media conferencing information to the TCP, wherein the dynamic information includes user leaving session information, user joining session information, and any changes in the subject of the multi-media conferencing session.

11. The method of claim 1, further comprising:

receiving, by the TS, a local media update request from the TCP during the ongoing multi-media conferencing session, wherein the local media update request comprises local media capability information, and information of a second TC;

retrieving the information from the local media update request received from the TCP;

determining a local media capability of the second TC based on the local media update request;

updating the local media capability information in memory; and providing media content to the second TC during the ongoing multi-media conferencing session based on the updated local media capability information.

12. The method of claim 11, further comprising:

updating the second TC regarding the updated local media capability information.

13. The method of claim 1, further comprising:

receiving, by the TS, a local media update request from the TCP during the ongoing multi-media conferencing session, wherein the local media update request comprises local media capability information of the TC, and information of the TC;

retrieving information from the local media update request received from the TCP;

determining a local media capability of the TC based on the local media update request;

updating the local media capability information in memory of the TS;

updating the TC regarding the updated local media capability information by the TCP;

blocking media content of the ongoing multi-media conferencing session based on the updated local media capability information; and providing media content of the ongoing multi-media conferencing session to the TC based on the updated local media capability information.

14. The method of claim 1, further comprising:

transmitting, by the TS, dynamic session information to the TCP processing and forwarding the dynamic session information to the TC, wherein the dynamic information includes user leaving session information, user joining session information, and any changes in the subject of the multi-media conferencing session.

15. A non-transitory computer-readable storage medium having instructions stored therein for performing a method of multi-media conferencing between telephony devices included in a first network and at least one network device connected to a second network, the instructions comprising instructions for:

receiving, by a telephony server (TS), a session request for a multi-media conferencing session; and establishing, by the TS, the multi-media conferencing session between a telephony client (TC) and the network device based on the session request, wherein the establishing the multi-media conferencing session comprises:

retrieving a first session identifier, a information of the network device or a conference group identifier of the network device, a media capabilities of the TC, and a session information from the received session request; and transmitting, to the network device, a session initiate request including a second session identifier, the media capabilities of the TC, and the session information, wherein the first session identifier includes information that identifies the multi-media conferencing session between the TC and the TS, and the second session identifier includes information that identifies the multi-media conferencing session on the network device.

16. A telephony server (TS) device for performing a method of multi-media conferencing between telephony devices included in a first network and at least one network device connected to a second network, the TS device comprising:

a network interface: and a processor which controls:

the network interface to receive, a session request for a multi-media conferencing session; and the TS device to establish, the multi-media conferencing session between a telephony client (TC) and the network device based on the session request, wherein the TS device establishes the multi-media conferencing session by:

retrieving a first session identifier, a information of the network device or a conference group identifier of the network device, a media capabilities of the TC, and a session information from the received session request; and transmitting, to the network device, a session initiate request including a second session identifier, the media capabilities of the TC, and the session information, wherein the first session identifier includes information that identifies the multi-media conferencing session between the TC and the TS, and the second session identifier includes information that identifies the multi-media conferencing session on the network device.

17. A method of multi-media conferencing between telephony devices included in a first network and at least one network device connected to a second network, the method comprising:

generating, by a telephony control point (TCP), a session request for a multi-media conferencing session between a telephony client (TC) and the network device, wherein the session request includes a first session identifier, session information, media capabilities of the TC, a information of the network device or conference group identifier of the network device, and a subject of the multi-media conferencing session;

transmitting the session request to a telephony server (TS); and receiving, from the TS, a confirmation message sent from the network device in response to a multi-media conference initiate request, wherein the multi-media conference initiate request is transmitted from the TS to the network device and the multi-media conference initiate request includes a second session identifier, the media capabilities of the TC, and the session information, wherein the first session identifier includes information that identifies the multi-media conferencing session between the TC and the TS, and the second session identifier includes information that identifies the multi-media conferencing session on the network device.

18. A telephony control point (TCP) device for performing a method of multi-media conferencing between telephony devices included in a first network and at least one network device connected to a second network, the TCP device comprising:

a network interface; and a processor which:

generates a session request for a multi-media conferencing session between a telephony client (TC) and the network device, wherein the session request includes a first session identifier, session information, media capabilities of the TC, a information of the network device or conference group identifier of the network device, and a subject of the multi-media conferencing session;

controls the network interface to transmit the session request to the TS; and controls the network interface to receiver, from the TS, a confirmation message sent from the network device in response to a multi-media conference initiate request, wherein the multi-media conference initiate request is transmitted from the TS to the network device, and the multi-media conference initiate request includes a second session identifier, the media capabilities of the TC, and the session information, wherein the first session identifier includes information that identifies the multi-media conferencing session between the TC and the TS, and the second session identifier includes information that identifies the multi-media conferencing session on the network device.

19. A method of multi-media conferencing between telephony devices included in a first network and at least one network device in a second network the method comprising:
- receiving, by the network device, a multi-media conference initiate request for establishing the multi-media conferencing session between the telephony client (TC) and the network device, when a session request received by a TS is associated with the multi-media conferencing session, wherein the multi-media conference initiate request comprises a global session identifier, a media capabilities of the TC, and a session subject, from the TS;
- transmitting, by the network device, a confirmation message to the TS in response to the multi-media conference initiate request; and
- establishing, by the network device, the multi-media conferencing session with the TC,
- wherein the global session identifier includes information that identifies the multi-media conferencing session between the TC and the TS on the network device.

20. A network device in a second network for performing a method of multi-media conferencing with telephony devices included in a first network, the network device comprising:
- a network interface; and
- a processor which controls:
  - the network interface to receive a multi-media conference initiate request for establishing the multi-media conferencing session between a telephony client (TC) and the network device, when a session request received by a TS is associated with the multi-media conferencing session, wherein the multi-media conference initiate request comprises a global session identifier, a media capabilities of a TC, and a session subject;
  - the network interface to transmit a confirmation message to the TS in response to the multi-media conference initiate request; and
  - the network device to establish the multi-media conferencing session with the TC,
- wherein the global session identifier includes information that identifies the multi-media conferencing session between the TC and the TS on the network device.

* * * * *